Aug. 29, 1967

G. F. RITTER, JR 3,338,695

METHOD AND APPARATUS FOR PRESS BENDING AND
TEMPERING GLASS SHEETS

Filed Feb. 7, 1966

INVENTOR.
George F. Ritter, Jr.
BY
Hobbe & Swope
ATTORNEYS

Aug. 29, 1967  G. F. RITTER, JR  3,338,695
METHOD AND APPARATUS FOR PRESS BENDING AND
TEMPERING GLASS SHEETS
Filed Feb. 7, 1966  5 Sheets-Sheet 2

INVENTOR.
George F. Ritter, Jr.
BY
Nobbe & Swope
ATTORNEYS

Aug. 29, 1967
G. F. RITTER, JR
3,338,695
METHOD AND APPARATUS FOR PRESS BENDING AND
TEMPERING GLASS SHEETS
Filed Feb. 7, 1966
5 Sheets-Sheet 4
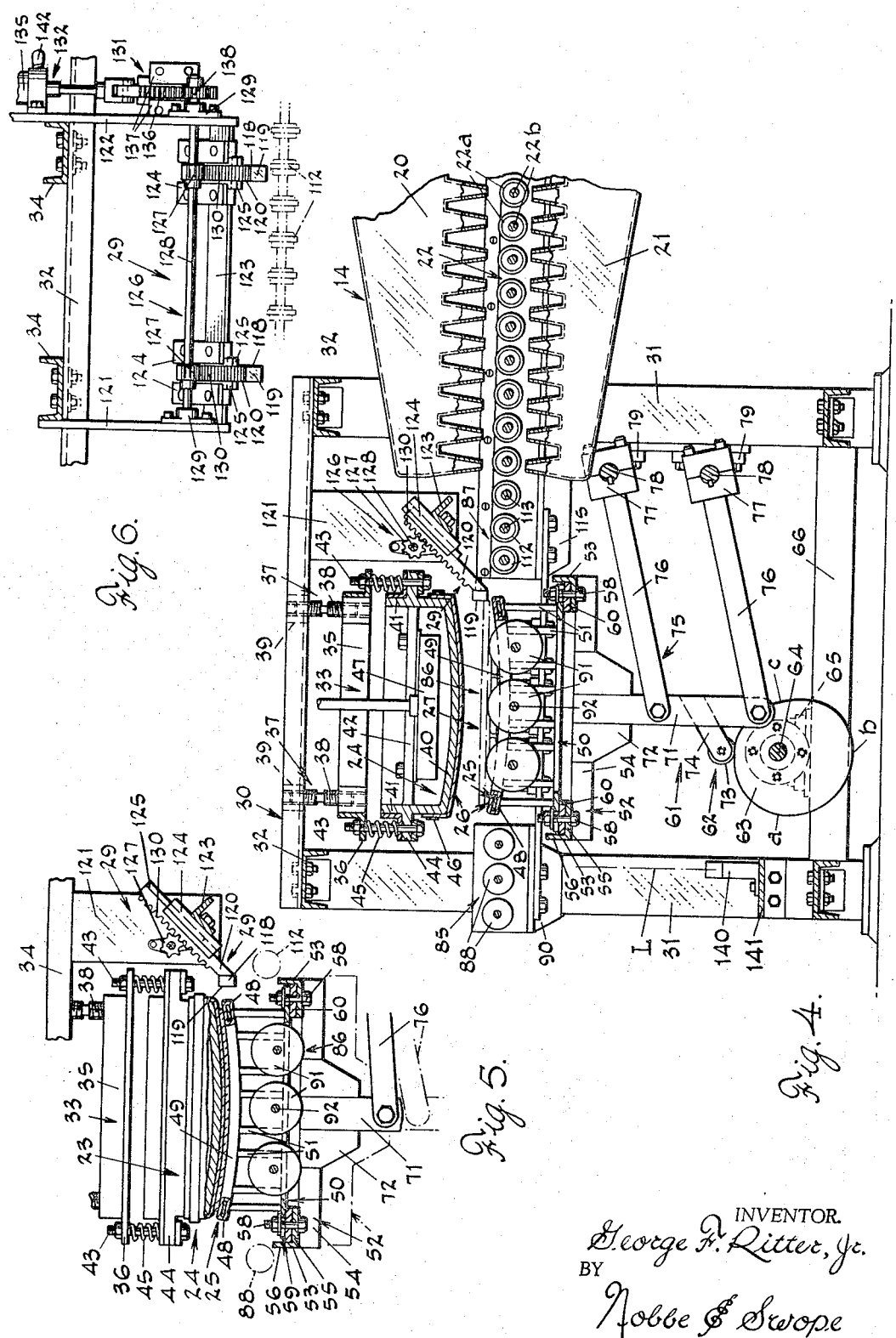
INVENTOR.
George F. Ritter, Jr.
BY
Nobbe & Swope
ATTORNEYS

United States Patent Office 3,338,695
Patented Aug. 29, 1967

3,338,695
METHOD AND APPARATUS FOR PRESS BENDING AND TEMPERING GLASS SHEETS
George F. Ritter, Jr., Toledo, Ohio, assignor to Libbey-Owens-Ford Glass Company, Toledo, Ohio, a corporation of Ohio
Filed Feb. 7, 1966, Ser. No. 536,490
11 Claims. (Cl. 65—104)

This application is a continuation-in-part of application Ser. No. 223,624, filed Sept. 14, 1962, now abandoned.

This invention relates generally to the production of curved, tempered glass sheets and more particularly to a new and improved method and apparatus for bending and tempering glass sheets.

The utilization of curved glass sheets as glazing closures, particularly in vehicles such as automobiles or the like, has increased considerably in recent years and the trend in modern automibile styling is toward employing curved sheets as sidelights as well as windshields and backlights. Such applications, however, give rise to certain problems in the production of curved sheets for this purpose in that they require that the sheets be bent to rather precisely defined curvatures dictated by the configuration of the opening in which they are to be mounted and, moreover, by the over-all design of the automobile. In addition, it is also important that sheets intended for use as automobile sidelights and backlights be tempered to increase their resistance to breakage and to modify the breaking characteristics of the glass whereby when broken the tempered sheets will disintegrate into relatively small, harmless particles as opposed to the rather large, jagged and dangerous pieces resulting when ordinary untempered glass is broken.

In general, the commercial production of curved, tempered sheets of glass is accomplished by heating substantially flat sheets of glass to an elevated temperature corresponding to the softening point of glass thus permitting the sheets to be formed or bent to the desired curvature followed by rapidly reducing the temperature of the sheets to a point below the annealing range of the glass thereby to temper the glass sheets.

The general object of the present invention is to provide a new and improved procedure for producing curved, tempered glass sheets.

Another object is to accomplish the foregoing by means of a novel bending apparatus which is relatively simple in construction yet efficient in operation as compared to former apparatus of this type.

Another object is to provide a bending apparatus operable to produce closely defined curvatures in glass sheets, which curvatures fall within a relatively narrow range of tolerances.

Still another object is to provide a manner of bending glass sheets which is fully automatic and thus facilitates mass production of curved, tempered glass sheets.

Other objects and advantages of the invention will become more apparent during the course of the following description when taken in connection with the accompanying drawings.

In the drawings, wherein like numerals are employed to designate like parts throughout the same:

FIG. 4 is a longitudinal, vertical sectional view taken on line 4—4 of FIG. 2, and with the pressing molds of the apparatus in the open position;

FIG. 5 is a fragmentary sectional view of the pressing molds in the closed position;

FIG. 6 is a transverse sectional view taken on line 6—6 of FIG. 4;

Figure 1:
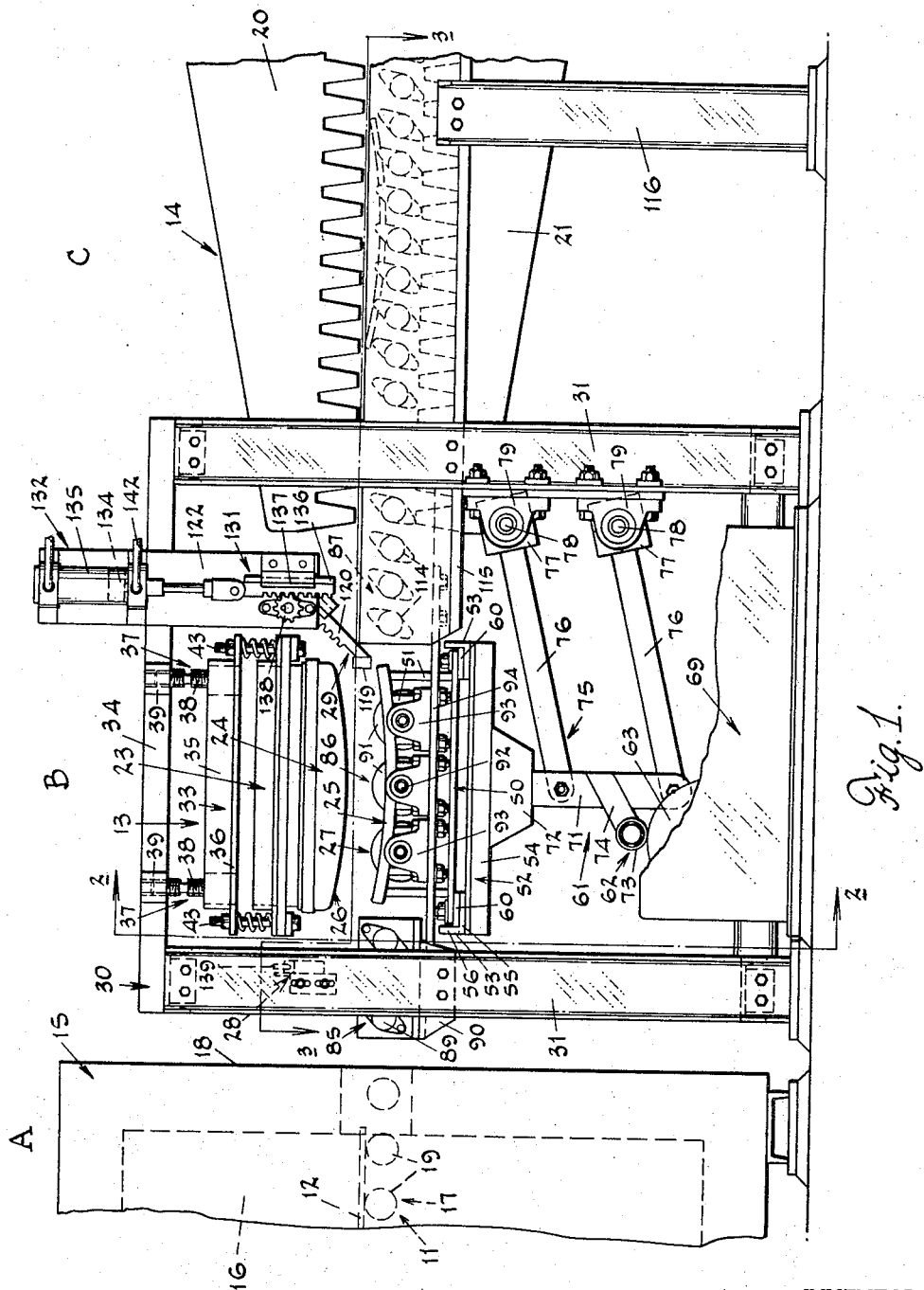
FIG. 1 is a side elevational view of a pressure bending apparatus constructed in accordance with this invention.
Figure 2:
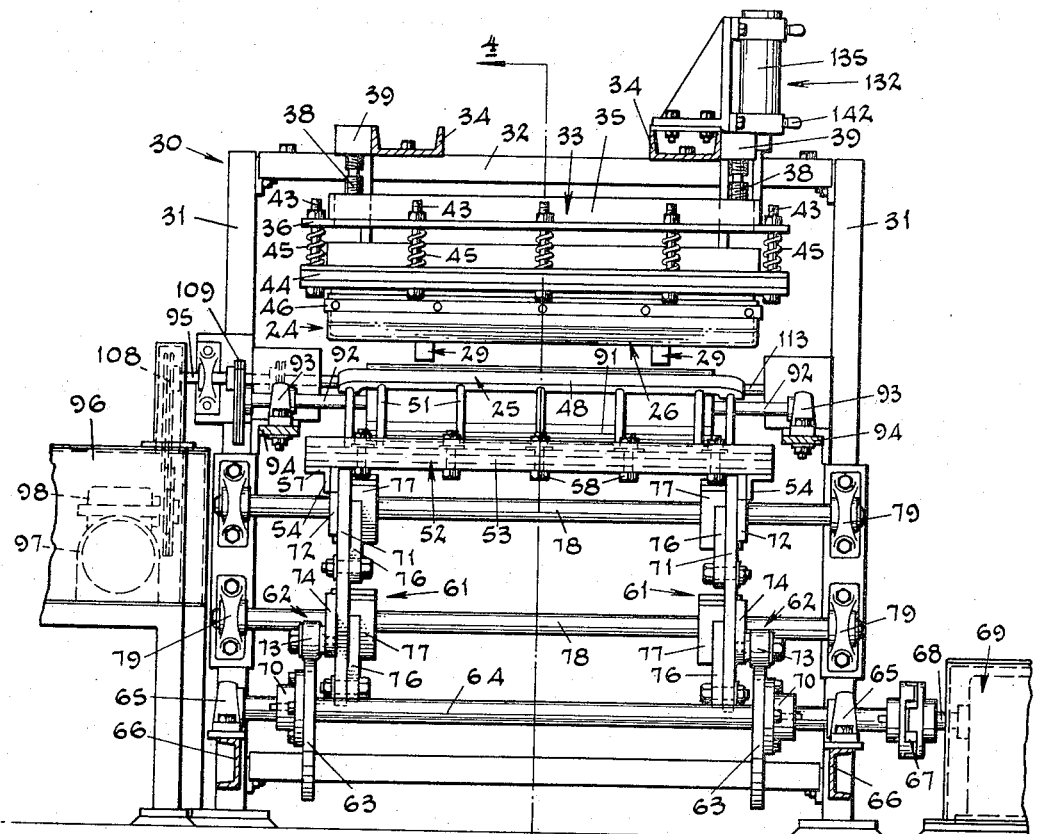
FIG. 2 is a transverse, vertical sectional view taken on line 2—2 of FIG. 1.

In the production of bent and tempered glass sheets in relatively large quantities, such as would be encountered in the commercial production of glazing closures for automobiles or the like, the sheets are heated, bent and tempered in a substantially continuous procedure. Usually, the sheets of glass are moved successively, one by one along a definite path through a heating area, a bending area and finally a chilling or tempering area, which areas are contiguous so that an individual sheet upon being moved through one area passes immediately into and through the following area.

For purpose of illustration, the novel features of the present invention are shown in the drawings incorporated in bending and tempering apparatus 10 of a type particularly adapted for use in the production of bent and tempered sheets of glass by a continuous process similar to that described above. Broadly stated, this apparatus includes a conveyor system 11 operable to carry glass sheets 12 along a definite, predetermined path through a heating area A having means (not shown) for heating of glass sheets to the desired temperature, a bending area B having bending means 13 for shaping the sheets to the desired curvature, and a tempering area C having cooling means 14 for reducing the temperature of the sheets to produce the desired temper in the sheets. To facilitate the detailed description to follow, the position and location of the various elements making up the bending and tempering apparatus will be related to the predetermined path defined by the conveyor system and hereinafter all references to the path shall be understood to refer to the path of movement of the sheets through the apparatus.

One heating means suitable for use in a continuous bending and tempering process is a tunnel-type furnace 15 having a heating chamber 16 defined by walls constructed of a suitable refractory. The sheets are moved through the chamber 16 on a conveyor 17 from an entrance end (not shown) to an oppositely disposed exit end 18 of the furnace 15. Herein, the conveyor 17 forms a part of the over-all conveyor system 11 and comprises a plurality of parallelly spaced, horizontally disposed rolls 19 extending transversely across the chamber 16 with their opposite ends journaled in opposed side walls of the furnace.

In order to produce the desired temper in the bent glass sheets, they are rapidly cooled from the elevated temperature at which they are bent to a temperature below the annealing range of glass. To this end, after being bent the sheets are exposed to a cooling atmosphere whereby the outer surfaces of the sheets are chilled or cooled at a faster rate than the interior areas of the sheets resulting in the outer surfaces being placed under compressive stress.

In the present instance, the sheets are cooled by blasts of relatively cool air directed against their opposite surfaces as they are moved along the predetermined path through the tempering area C. For this purpose, the cooling means 14 includes so-called blast heads 20 and 21 spaced along the path from the exit end 18 of the furnace 15 and disposed above and below the path. The sheets are carried by a conveyor 22 along the path through the tempering area C and between the blast heads which direct opposed blasts of air toward the conveyor. The conveyor 22 comprises rolls 22a fast on shafts 22b extending transversely across the path and being parallelly spaced apart to permit the blasts of air from the lower blast head 21 to pass through the conveyor and impinge on the undersurface of the glass sheet carried thereby. Further, to insure free passage of the air through the conveyor 22 and to reduce marring of the sheets, the rolls 22a comprise a series of relatively narrow segments spaced apart along each shaft 22b. The segments are encircled with a narrow band of refractory material which band extends radially outwardly from the segments to engage the undersurface of the glass sheets.

In accordance with the present invention, a novel bending means 13 is disposed in the bending area B between the exit end of the furnace and the entrance end of the blast heads, which means accurately bends the sheet to the desired configuration automatically and as an incident to movement of the sheets along the path and thereafter quickly transfers the sheets to the entrance end of the blast heads. The apparatus bends the heated glass sheets efficiently to within very close tolerances of the curvature desired and performs the operation rapidly so that the time elapsing between the sheets emerging from the heated atmosphere and their entering the cooling means is of very short duration, thereby insuring that upon entering the tempering area C they will be at a sufficiently high temperature to produce the desired temper.

In general, the bending means 13 includes a shaping mold 23 comprising male and female mold parts 24 and 25 disposed above and below the predetermined path. Complemental shaping surfaces 26 conforming in curvature to the sheets when bent are formed on the opposed faces of the mold parts 24 and 25 which are movable relative to each other and to the path to bring the shaping surfaces into pressing engagement with the opposite sides of the heated sheets.

The heated sheets are moved along the predetermined path from the exit end of the furnace 15 to the entrance end of the blast heads 20 and 21 and between the mold parts 24 and 25 on a roller-type conveyor 27 disposed in end-to-end alignment with both the conveyor 17 in the furnace and the conveyor 22 in the blast heads. In response to a signal emanating from a device 28 sensing the movement of a sheet along the path, a bending sequence is initiated in which the sheet is stopped momentarily between the mold parts 24 and 25, positioned relative to the shaping surfaces 26 by a locating device 29, removed from the conveyor 27 and pressed between the shaping surfaces of the mold 23, and then returned to the conveyor for movement along the path and between the blast heads 20 and 21.

The bending means 13 is carried by a suitable supporting framework 30 which includes two substantially vertically disposed columns 31 disposed at each side of the path and spaced apart longitudinally along the path with the columns on opposite sides of the path being transversely aligned. The columns 31 extend upwardly above the conveyor 27 with their upper ends tied together by horizontally disposed beams 32 extending transversely across the path and secured at their opposite ends to the aligned columns to form a rectangular box-like structure.

As mentioned above, the glass sheets are shaped by being pressed between the complemental shaping surfaces 26 formed on the male and female mold parts 24 and 25. To this end, the mold parts are mounted to move relative to each other between an open position wherein the mold parts are spaced apart with one of the parts 24 above the conveyor 27 and the other part 25 below the conveyor to a closed position wherein the shaping surfaces 26 on the mold parts are in close proximity and operable to press a glass sheet therebetween. While either or both mold parts 24 or 25 may be movably mounted, in the present instance, the upper mold part 24 remains substantially stationary and the lower mold part 25 is mounted to reciprocate back and forth in a vertical plane toward and away from the upper mold part. In this manner, as a heated sheet is carried by the conveyor 27 into the bending area B and between the mold parts 24 and 25, it is lifted from the conveyor by the lower mold part, carried by the lower mold part into pressing engagement with the upper mold part and returned to the conveyor for movement along the path into the tempering area C.

As best shown in FIG. 4, the upper mold part 24 is supported above the plane of the conveyor 27 on a mounting frame 33 carried by beams 34 extending longitudinally along the path and fixed at their opposite ends to the beams 32. The mounting frame 33 comprises angle iron members 35 arranged in a substantially rectangular open configuration with one leg of each member lying in a substantially horizontal plane thus forming a laterally projecting flange 36 integral with the frame 33. In order to permit alignment of the mounting frame 33 with the conveyor 27, the frame is attached to the beams 34 by adjustable means 37 permitting selective raising or lowering of each corner of the frame. Herein, the adjustable means 37 comprises rods 38 extending between the mounting frame 33 and the beams 34 adjacent each corner of the frame and having their opposite ends threaded into tapped blocks 39 secured to the beams and into the frame.

Within the spirit of the invention, the mold part 24 may be of any construction and may be formed from a variety of materials which can withstand the rather high temperatures to which the mold is subjected. In the exemplary embodiment, the mold part 24 comprises a cup-shaped structure cast from a suitable material such as metal or plaster and including an end wall 40 and upstanding side walls 41 formed integrally with the end wall. Bracing ribs 42 span the side walls 41 at the open end of the mold to reinforce the side walls. A male or generally convex shaping surface 26 is formed on the outer of downwardly directed surface of the end wall 40. In the present instance, the upper mold part 24 and the mounting frame 33 are illustrated as being substantially rectangular in outline, such as would be utilized in bending automobile sidelights, with the long sides of the rectangle extending transversely across the path of movement of the sheets through the bending area B. It will be appreciated, however, that the particular outline of the mold is dictated by the shape of the glass sheets to be bent.

The upper mold part 24 is supported on the mounting frame 33 by means of bolts 43 passing through a flange 44 formed integrally with and projecting laterally outwardly from the side walls 41 of the mold extending transversely across the path and through the flange 36 on the mounting frame. The mold part 24 is held in spaced relation to the mounting frame 33 by resilient means such as coil springs 45 telescoped on the bolts 43 and acting between the opposed surfaces of the flange 44 on the mold and the flange 36 on the mounting frame. The coil springs 45 permit yielding of the upper mold part 24 to prevent excessive pressure being exerted on the glass sheets as the lower mold part 25 is moved into pressing engagement therewith. In addition, by tightening or loosening the nuts on the bolts 43 thereby compressing or relieving the springs 45, the plane of the mold part 24 may be adjusted relative to the plane of the conveyor 27.

Preferably, in order to avoid marring of the glass sheets and to better enable the upper mold part 24 to withstand the relatively high temperatures to which it is subjected, the shaping surface 26 is covered with a heat resistant, non-abrasive material such as asbestos, glass cloth or the like. The material covers the end wall 40 and extends upwardly along the side walls where it is clamped to the mold part by a band 46 encircling the side walls. If the mold part were to be made from metal, in order to maintain the temperature differential between the shaping surface 26 and the glass sheets at a minimum, the mold part 24 may be heated by a suitable thermostat controlled heater 47 disposed within the cup-shaped mold part and fixed to the bracing webs 42 between the mold walls.

In the illustrated embodiment, the lower mold part 25 is an open ring-type structure having shaping surfaces 26 which engage only the marginal edge portions of a glass sheet thereby to avoid marring of the viewing area of the sheet. For this purpose, the mold part is formed from side bars 48 and end bars 49 arranged in a substantially rectangular configuration and having shaping surfaces 26 formed on their upwardly directed faces, which surfaces conform in outline and curvature to the shaping surface on the upper mold part 24. Here again, it will be appreciated that the particular conufiguration of the mold part 25 is dictated by the outline shape of the glass sheet to be bent.

The lower mold part 25 is mounted to move relative to the conveyor 27 from a lowered position wherein the shaping surfaces 26 formed thereon are disposed below the plane of the conveyor 27 to the raised position above the conveyor and adjacent the mold part 24 wherein the shaping surfaces 26 are in close proximity to the shaping surfaces on the upper mold part 24. To this end, the mold part 25 is carried on a base 50 disposed below the plane of the conveyor by upright posts 51 extending between the base and the mold part interjacent the rolls of the conveyor 27. The base 50 is of open rectangular shape and is mounted on a carriage 52 comprising angle iron side members 53 and end members 54 also arranged in a rectangular configuration slightly larger than the base 50. The angle iron side members 53 extend transversely across the path with one leg 55 disposed in a substantially horizontal plane and the other leg 56 projecting upwardly therefrom at opposite sides of the carriage 52. The end members 54 also have one leg 57 disposed in a horizontal plane and, together with the legs 55 of the side members, form a continuous laterally projecting flange extending around the carriage. The base 50 rests on the flange between the upstanding legs 56 on the side members 53 and is secured to the carriage 52 by bolts 58 extending through holes bored in legs 55 on the side members 53 and through elongated slots 59 provided in the corresponding edges of the base. The slots 59 permit the base 50 and thus the lower mold part 25 carried thereby to be shifted in a transverse plane relative to the carriage 52 to properly align the lower mold part with the upper mold part 24. Disposed between the base 50 and the carriage 52 are shim bars 60 which may be varied in thickness to properly position the mold in relation to the plane of the path.

Raising and lowering of the lower mold part 25 toward and away from the upper mold part 24 is accomplished through the medium of a suitable actuating mechanism 61 coupled to the carriage 52 supporting the mold part. While many different actuating mechanisms could be employed to impart the desired reciprocal motion to the lower mold part, in the illustrated embodiment a simple cam and follower mechanism is utilized. More specifically, a cam follower 62 operatively coupled to the carriage rides on the outer periphery of a disk cam 63 shaped to impart the desired sequence of motion to the follower and thus to the carriage.

Herein, two actuating mechanisms 61 are provided, one on each side of the path but, since the mechanisms are identical in construction, a detailed description of one will suffice. The disk cam 63 is fast on a shaft 64 underlying the lower mold part 25 and extending transversely across the path beneath the conveyor 27. The shaft 64 is journaled adjacent its opposite ends in bearings 65 mounted on structural members 66 disposed at opposite sides and extending longitudinally of the path with their opposite ends carried by the vertical columns 31. One end of the shaft 64 projects outwardly beyond the framework 30 and is connected, through the medium of a coupling 67, to the output shaft 68 of a power source 69 operable to rotate the shaft about a fixed horizontal axis. To facilitate removal and replacement of the cam 63, the latter is bolted to a hub 70 keyed to the shaft 64 intermediate its ends and beneath the end member 54 of the carriage. As noted above, similar actuating mechanisms 61 are provided at opposite sides of the mold and, therefore, it will be appreciated that an identical cam is similarly mounted on the shaft 64 beneath the opposite member 54.

As the cam 63 is rotated by the shaft 64, the follower 62 rides along the developed irregular outline of the outer periphery of the cam and thereby is reciprocated along a substantially vertical axis toward and away from the axis of the shaft. The follower 62 is coupled to the carriage 52 so as to transmit the reciprocal motion imparted to the follower by the cam 63 to the lower mold part 25. For this purpose the follower 62 is mounted on a bar 71 depending from the end member 54 of the carriage 52 toward the shaft 64 with the upper end of the bar 71 being secured to the carriage. In the present instance the bar 71 is fixed at its upper end to a plate 72 secured to the end member 54 of the carriage 52 and extending downwardly therefrom. The follower 62 comprises a roller 73 journaled on one end of an arm 74 secured at its opposite end to the bar 71 intermediate the ends thereof and inclined downward toward the cam 63 whereby the roller 73 rests on the edge of the cam and thus supports the lower mold part 25.

In order to guide the endwise movements of the bar 71 and to support it at all times in a substantially vertical position, the bar is coupled to the framework 30 of the bending means by links which, together with the frame and the bar, comprise a four bar linkage 75 in which the links form a parallelogram. As shown in FIG. 1, the bar 71 and one of the vertical columns 31 form one pair of parallel links in the linkage 75. The other pair of parallel links comprise two elongated members 76 extending between the bar 71 and the framework 30 and having one of their ends journaled to the bar 71 at spaced points therealong and their opposite ends fixed to split blocks 77 clamped and keyed to parallel shafts 78 extending between the transversely aligned columns 31 with their opposite ends journaled in bearings 79 mounted on the columns to rock about parallel, fixed substantially horizontal axes. Since with this type of linkage, the links of each pair remain parallel to each other at all times, the bar 71 remains parallel to the vertical columns 31 throughout its endwise movements.

It will be appreciated that the bar 71 does not move in a straight line but rather follows a slightly arcuate path as it is raised and lowered by the actuating mechanism 61. Initial adjustment, however, may insure that, in the uppermost position of the lower mold part 25, the shaping surfaces 26 on both the mold parts 24 and 25 are in proper registry.

Herein, the periphery of the cam 63 is developed so that as the shaft 64 is rotated in a clockwise direction by the power source 69, the follower 62 rides along a rise $a$ on the cam which lifts the mold part 25 above the plane of the conveyor 27 to lift a sheet resting on the conveyor and move it into pressing engagement with the shaping surface 26 on the upper mold part 24. As the cam continues to rotate, the mold part is held in the raised position by a dwell section $b$ of the cam, whereafter it is rapidly lowered as the follower rides over a fall $c$ on the cam. The sheet is thus quickly lifted from the conveyor by the lower mold, moved into engagement with the upper mold, held in this position momentarily to permit the sheet to assume the desired shape and then rapidly returned to the conveyor for movement into the tempering area.

From the foregoing, it will be appreciated that the lower mold part 25 is moved intermittently and is raised only when a heated sheet 12 is moved between the mold parts 24 and 25 by the conveyor 27. When the sheet is properly positioned relative to the mold parts 24 and 25 by the locating device 29, which will be more fully disclosed hereinafter, movement of the lower mold part 25 through one raising and lowering cycle is effected by rotation of the shaft 64 through one revolution. To this end, the power source 69 coupled to one end of the shaft 64 includes a combined magnetic clutch and brake unit 81, commonly identified as a cycle-dyne unit, which controls the rotation of the shaft 64 in response to signals emanating from a suitable device 28 sensing the presence of a sheet in the bending area B. The cycle-dyne unit 81 is driven by a motor 83 and is coupled to the shaft 64 through a speed reduction unit 84. The output shaft of the unit 81 is normally prevented from rotating by the brake of the unit 81 but in response to a signal from the sensing device 28, which may be a photo-electric cell or the like, the brake is released and the clutch engaged to couple the output shaft through the speed reducing unit to the shaft 64. After the shaft 64 has been rotated through one revolution which results in the lower mold being moved through one up and down cycle of movement, the clutch is released and the brake once more energized to stop and hold the output shaft of the unit 81.

As will be apparent, the glass sheets begin losing heat and decreasing in temperature as soon as they leave the heated atmosphere of the furnace 15 and begin their movement toward the bending area B. In order to insure that their temperature will not decrease below that necessary for proper bending and tempering of the sheets, the conveying system 11 associated with the apparatus of the present invention and the apparatus itself are designed to move and bend the sheets quickly and efficiently and to deliver them to the entrance end of the blast heads 20 and 21 at a sufficiently high temperature to insure proper tempering. To this end, the conveyor 27 receives the sheets from the furnace conveyor 17, moves them at a constant speed to a position between the mold parts and stops while the lower mold part is actuated. After being bent, the sheet is returned to the conveyor 27 and removed thereby from the bending area B at a rapid rate of speed as compared to the rate of speed at which the sheets move through both the furnace and the blast heads. Adjacent the entrance end of the blast heads 20 and 21 the movement of the sheets is decelerated to a speed comparable to that of their movement through the furnace, which rate of speed is such as to promote a proper rate of cooling to thereby produce the desired temper. To accomplish this the conveyor 27 comprises three conveyor sections; an entry section 85, a support section 86 and a take-out section 87. The entry section 85 of the conveyor system 27 constitutes a continuation of the furnace conveyor 17 and is operable to move the sheets at substantially the same speed as they are moved through the furnace 15 from the exit end 18 of the furnace into the bending area B wherein the sheets are transferred to the support section 86 of the conveyor 27. The support section 86 and the take-out section 87 are driven at variable speeds to move the sheets in the manner described above.

The entry section 85 of the conveyor system 27 comprises a series of rollers 88 journalled in bearings 89 carried by structural members 90 attached to the columns 31 at opposite sides of the path to turn about parallel axes extending transversely across the path. The rollers 88 are rotated about their axes by a drive means (not shown) which, it will be appreciated, could be either the same as that driving the furnace conveyor 17 or an entirely separate drive means; the only limitation being that the furnace conveyor and the entry section be driven at substantially the same speed so as to prevent relative movement between the glass sheets and the conveyor.

The support section 86 of the conveyor 27 comprises a series of rolls 91 disposed within the confines of the open ring outline of the lower mold part 25 and mounted on shafts 92 extending transversely of the path along parallel axes. The shafts 92 are located between the bars 48 and 49 of the mold part 25 and the base 50 with the opposite ends of the shafts projecting outwardly between the posts 51 and being journaled in bearings 93 carried by mounting plates 94 disposed at opposite sides of the path and removably secured at their opposite ends to the framework 30. This mounting arrangement for the support rolls facilitates removal of the rolls when molds having different outline configurations are utilized.

To drive the support section rolls 91 in the proper sequence of operation and in synchronization with the movements of the lower mold part 25, the shafts 92 are coupled to an output shaft 95 of a multiple speed power source 96. For this purpose, one end of each shaft 92 extends through the associated bearing 93 and beyond the mounting plate 94 and is coupled by suitable means such as an endless belt or chain to the output shaft 95 of the power source 96.

The power source 96 includes a motor 97 coupled through a suitable gear reduction unit 98 to an input shaft 99 of a magnetic clutch 100, which shaft is journaled to rotate about a fixed axis. A driving member 101 of the clutch 100 is fast on the shaft 99 intermediate its ends to rotate therewith and is selectively engageable with two driven members 102 and 103 of the clutch, which members are disposed at opposite sides of the driving member and mounted on the shaft to rotate relative thereto. The driven members 102 and 103 are coupled to a shaft 104 journaled to rotate about an axis parallel to the axis of the shaft 99 through the medium of suitable drive means such as pulleys 105 fixed to the driven members and the shaft and belts 106 entrained around the pulleys. As is well known, by selecting the size of the pulleys utilized, the shaft 104 may be rotated at either of two speeds depending upon which driven member 102 or 103 is engaged with the driving member 101 of the clutch. When the clutch 100 is entirely disengaged, rotation of the shaft 104 is suspended and no power is transmitted to the conveyor 27 from the power source 96. To stop the shaft 104 quickly and to prevent it from turning when the clutch is not engaged, a magnetic brake 107 is associated with the shaft and suitably controlled so as to be activated when the clutch is disengaged.

The shaft 104 is coupled by a suitable belt and pulley drive means 108 to the output shaft 95 of the power source 96 which shaft is rotatable about a fixed axis extending parallel to shaft 104 and projects outwardly from the power source toward the conveyor 27. The power source 96 is coupled to the support rolls 91 through the medium of an endless belt or chain 109 entrained around a pulley 110 fast to the output shaft 95 and pulleys 111 fixed to the end of each support roll shaft 92.

The take-out section 87 of the conveyor 27 includes a plurality of rolls 112 carried by shafts 113 disposed along parallel axes extending transversely across the path with the opposite ends of the shafts journaled in bearings 114 mounted on structural braces 115 extending longitudinally along opposite sides of the path. The structural braces 115 are carried at one end by the columns 31 and adjacent their opposite ends by vertically disposed pedestals 116. The braces extend along the path past the blast heads 20 and 21 and support the opposite ends of the shafts 22b of the conveyor 22.

Figure 3:
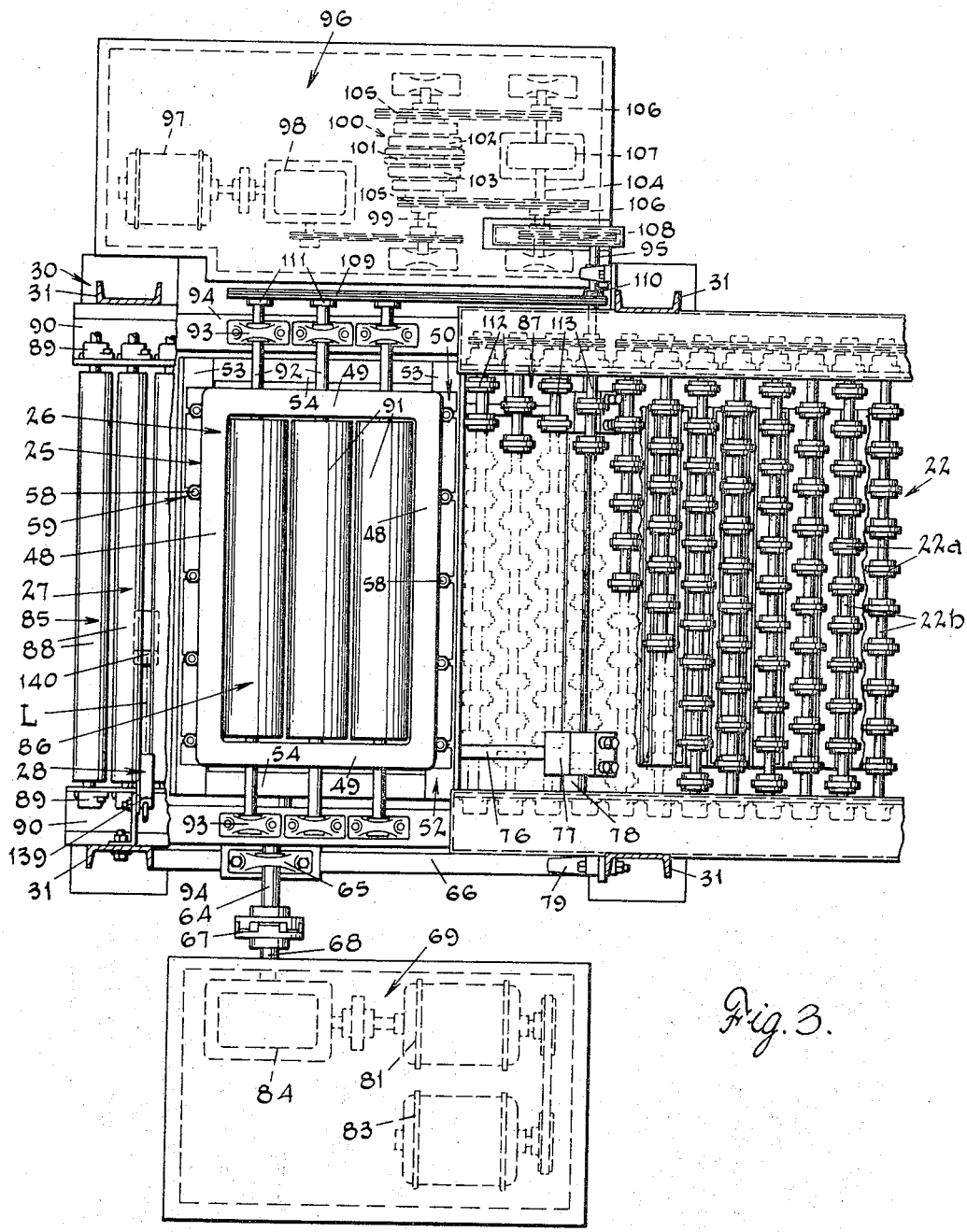
FIG. 3 is a horizontal sectional view taken on line line 3—3 of FIG. 1.

As best shown in FIG. 3, the take-out rolls 112 are disposed in the proximity of the entry end of the chilling or tempering area C of the blast heads 20 and 21 and are also operated at variable rates of speed by the power source 96 whereby their rotation is identical to that of the support rolls 91 and in this manner cooperate with the support rolls to rapidly move the bent sheets of glass from the bending area B and deliver them to the conveyor 22 between the blast heads. Accordingly, in the present instance the output shaft 95 of the power source 96 extends across the path and supports one of the rolls 112 of the take-out section 87 of the conveyor 27. The output shaft 95 is coupled to and drives the remaining shafts 113 of the take-out section 87 at rates of speeds determined in the manner outlined above by the magnetic clutch 100 and the brake 107.

With the particular drive arrangement described above, each of the shafts 92 are driven in common from the pulley 110 on the shaft 95 by means of a belt 109 trained thereabout. The shaft 95 also drives the shafts 113 and so that the take-out rolls 112 will be driven at the same rates of speed as the support rolls 91. Normally, the rolls of both the support section 86 and the take-out section 87 are driven at the same rate of speed as the rolls of the entry section 85 which, in turn, are driven at the same rate of speed as the rolls of the furnace conveyor 17. When a glass sheet is received on the rolls 91 of the support section 86, its forward movement is halted by the locating device 29 preparatory to the actual pressing operation which is initiated by the movement of the sheet past the sensing device 28. More specifically, upon perceiving the presence of a sheet moving along the path into the bending area B, the sensing device 28 produces a signal operable, through suitable circuitry, to sequentially disengage the magnetic clutch 100 and energize the brake 107 to halt the rotation of the support rolls 91 and the take-out rolls 112. After the bending sequence is completed, the brake 107 is released and the clutch 100 engaged to rotate the rolls of the support and take-out sections 86 and 87 at an accelerated rate of speed and independently of the rolls of the entry section 85.

As described above, when a heated sheet is carried from the heating area A into the bending area B, rotation of the support rolls 91 is halted to interrupt the movement of the sheet as its leading edge contacts the locating device 29 which properly positions the sheet relative to the shaping surfaces 26 on the mold parts 24 and 25. In the present instance, as shown in FIGS. 1, 4 and 6, the locating device 29 includes transversely spaced retractable stop members 118 carried by the framework 30 to move toward and away from the path of movement of the sheets. The stop members 118 include abutment surfaces 119 formed on arms 120 slidably supported on the framework 30 above the conveyor 27 for linear movement between a raised and a lowered position. In the lowered position, the surfaces 119 are disposed in the plane of the path in order to engage the leading edge of a sheet being carried along the path and into the bending area and to correctly position this sheet relative to the mold parts. It will be appreciated that the operation of the support rolls 91 is controlled so that rotation of the latter is halted at the same time as the sheet engages the stops 118 so as to prevent relative movement between the support rolls and the glass sheet. When the upward movement of the lower mold part 25 is initiated, the stops 118 are retracted to an out-of-the-way position above the path and remain in this position until the bending sequence is completed and the bent sheet carried out of the bending area B.

Herein, the device 80 is carried by a pair of plates 121 and 122 depending from the beams 34 at opposite sides of the path with their upper ends fixed to the beams and their lower ends joined together by a horizontally disposed bridging member 123 extending across the path. The bridging member 123 is provided with guide-ways 124 for slidably supporting gib portions 125 integral with the arms 120.

Sliding of the arms 120 back and forth in the guide-ways 124 is accomplished by an actuating mechanism 126 operable to impart linear axial movement to the arms. While various well-known mechanisms could be employed, herein a simple pinion and rack arrangement is used. To this end, pinion gears 127 are fast on a shaft 128 spanning the plates 121 and 122 and journaled adjacent its ends in bearings 129 carried by the plates to rotate about a fixed axis. The pinions 127 mesh with a rack 130 formed on the arms 120 whereby rotation of the shaft 128 in a clockwise direction as shown in FIG. 5 slides the arms relative to the axis of the shaft away from the path. Rotation of the shaft 128 in the opposite direction slides the arms 120 in the opposite direction toward the path; sliding of the arms in either direction being guided by the gib portions 125 and the coacting guide-ways 124.

Rotation of the shaft 128 may be effected by a reversible power actuator 131 operable to selectively rotate the shaft in opposite directions. In the embodiment illustrated, the actuator 131 comprises a reciprocating mechanism 132 such as a piston and cylinder together with a gear arrangement coupling the mechanism 132 to the shaft 128 and operable to rotate the latter. Accordingly, the mechanism 132 comprises a double acting piston 134 sliding in a cylinder 135 mounted on the plate 122 adjacent one end of the shaft 128. The driven member or piston rod carries a toothed rack 136 slidable endwise in guide-ways 137 mounted on the plate 122 along a path extending normal to the shaft 128. Meshing with the rack 136 is a pinion 138 fast on an extension of the shaft 128 projecting through the plate 122. Pressure fluid may be admitted selectively to the rod or head end of the cylinder 135 to slide the piston 134 along the cylinder and thereby rotate the shaft 128, through the medium of the rack 136 and pinion, in either direction.

To aid in a more complete understanding of the present invention, the operation of the apparatus in bending and tempering one sheet of glass will be briefly summarized. The sheet of glass 12 to be bent is heated as it is carried through the furnace 15 on the conveyor 17. At the exit end of the furnace, the sheet is received on the entry section 85 of the conveyor 27 which moves it onto the support rolls between the mold parts 24 and 25, whereupon the leading edge of the sheet engages the abutment surfaces 119 of the stop members 118 and is thereby properly positioned above the shaping surface 26 on the lower mold part 25. Upon entering the bending area B, the sheet intercepts a beam L from a lamp source 139 to the photocell 140 mounted by an adjustable bracket 141 on one of the columns 31. Interruption of the light beam L produces a signal which, through a suitable control system, initiates the sequentially occurring phases in one cycle of the bending means 13. The timing of the control system is such that when the leading edge of the sheet engages the abutment surfaces 119 of the locating device 80, the magnetic clutch 100 will be disengaged and the magnetic brake 107 will be energized to halt rotation of the shaft 104 and thereby the output shaft 95 of the power source 96. In timed relation, the power source 69 is activated to rotate shaft 64 and the cams 63 fast thereto which, through the followers 62, raise the carriage 52. Also, when the support rolls 91 are rendered idle and in advance of the raising of the carriage 52 and mold member 25 thereon, pressure fluid is admitted through pipe 142 to the rod end of the cylinder 135 causing the piston 134 to slide away from the path, drawing the rack 136 past the pinion 138 thereby rotating the shaft 128 to move the stop members 118 upward to their inoperative positions.

As seen in FIG. 4, when the cams 63 are in their rest position, the lower mold part 25 is disposed slightly below the outer periphery of the support rolls 91 whereby the sheet is supported on the rolls in a substantially horizontal plane. As the cams 63 are rotated, the followers 62 traverse the section a of the developed periphery of the cams, raising the lower mold part to the lift sheet from the rolls 91 and carry it upwardly into pressing engagement with the shaping surface 26 of the upper mold part 24; the movements of the lower mold part being guided by the four bar parallel linkage 75 to insure accurate registration of the upper and lower mold parts.

As the followers 62 traverse the dwell b of the cams 63, the sheet is held between the mold parts and thereby assume the curvature defined by the shaping surfaces 26. During further rotation of the shaft 64 and cams 63, the followers 62 traverse the descending or fall sections c thereof and the mold part 25 is lowered with the carriage 52 to return the bent sheet to the conveyor 27. When the sheet again rests on the rolls 91 and operation of the power source 69 is terminated, the timed sequence of control re-energizes the clutch 100 and releases the brake 107 thereby permitting the shaft 95 to direct power through belt 109 to rotate rolls 91 and 112 at a relatively high rate of speed. The rolls 91 and 112 thereby move the bent sheet into the tempering area C and between the blast heads 20 and 21. Further, when the sheet is moved onto the rolls 22a of the blast head conveyor 22, the clutch 100 is reversed to reduce the speed of the output shaft 95 and thereby the speed of rolls 91 and 112. Substantially simultaneously, pressure fluid is exhausted from the rod end of the cylinder 135 and admitted to the head end to effect return movement of the stop members 118 toward the path to move the abutment surfaces 119 into the plane of the path. With the lower mold part 25 in its lowermost position, the stop members 118 of the locating device 29 positioned to be engaged by a succeeding glass sheet and the sets of rolls 91 and 112 operated at reduced rates of speed, the automatically occurring cycle of the bending equipment is brought to completion and in readiness for subsequent operation upon a sheet of glass successively passing through the sensing device 28.

Figure 8:
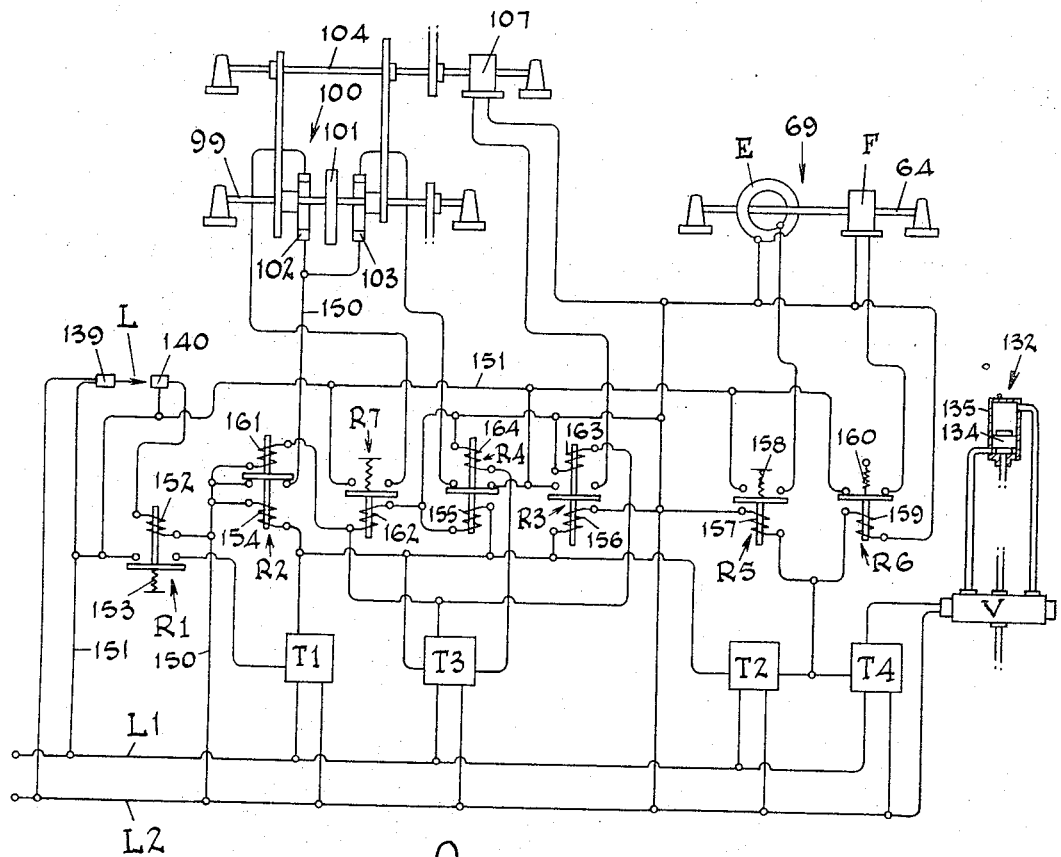
FIG. 8 is a diagrammatic view of the control system.

Illustrated in FIG. 8 is a suitable circuit for effecting the above-described sequence of operation of the various components of the apparatus. In this circuit, lines L–1 and L–2, which are connected to a suitable power line source, supply current to the various clutches and brakes through relays R–1 to R–6 in timed sequence as controlled by timers T–1 to T–4. This control circuit is designed to initiate one cycle of the bending operation as each successive sheet moves out of the furnace and through the bending zone, the operation being initiated in response to signals from the sensing device 28.

Assuming that a sheet has just been moved out of the bending area and the next sheet is about to enter this area, the entry section 85 of the conveyor 27 is then being driven at the slower rate of speed by the clutch 100 and the components of the circuit, that is, the various relays, are in the condition illustrated in FIG. 8 with a circuit completed from L–2 through line 150 through relay R–2 and to one side of the low speed coil 103 and back from the other side of the coil 103 through relays R–4 and line 151 to L–1.

The beam of light L emitting from the lamp source 139 and directed onto the photoelectric cell 140 energizes this cell which, in turn, energizes coil 152 of relay R–1 maintaining this relay in an open condition against the action of the spring 153 urging the relay toward the closed position. Now, as a sheet leaving the furnace and moving along the path defined by the entry section 85 of the conveyor 27 breaks the beam of light L, the coil 152 is de-energized permitting relay R–1 to close thus completing a circuit to timer T–1. After a suitable time delay during which the heated sheet is moved into proper bending position between the mold parts 24 and 25, timer T–1 completes a circuit through coil 154 of relay R–2, opening relay R–2 thereby breaking the circuit to one side of the coil 103. Simultaneously, timer T–1 completes a circuit to coil 155 of relay R–4 to open this relay and break the circuit to the opposite side of the coil 103 and, in addition, energizes coil 156 of relay R–3 to close this relay and energize the brake 107 to lock the shaft 104 against further rotation.

Timer T–1 also activates timer T–2 which, after the sheet has been moved into the proper bending position, energizes coil 157 of relay R–5 to close this normally opened relay against the action of spring 158 thereby completing a circuit to the power unit E of the power source 69 and at this time also energizes coil 159 of relay R–6 to open the contacts of the relay against the action of the spring 160 normally holding these contacts in the closed position thereby to break the circuit to the brake F of the power source 69. The shaft 64 of this power source is then rotated by the power unit E to move the lower mold part between its raised and lowered position. Upon completion of one revolution of the shaft 64 which carries the lower mold part from its position below the support conveyor into pressing engagement with the upper mold part and again returns the lower mold part to its initial position, timer T–2 times out thereby de-energizing coils 157 and 159 reversing relays R–5 and R–6 to de-energize the power unit E and energize the brake F.

At the time that timer T–2 energizes coils 157 and 159 to start the actual bending cycle of the lower mold part, it also activates timer T–4 which reverses valve V which then supplies pressure fluid to the rod end of the cylinder 135 of the stop mechanism 132 to slide the piston 134 upwardly thereby raising the stops to their retracted out-of-the-way position.

At the same time the timer T–2 is activated by the timer T–1, the timer T–3 is activated to time a period of sufficient duration to permit the actual bending of the sheet to be completed. Then after the sheet is bent, the timer T–1 times out energizing coil 161 of relay R–2 to pull in the armature of this relay to complete the circuit to one side of the high speed coil 102 of the clutch 100. Simultaneously, the timer T–3 energizes coil 162 of the normally opened relay R–7 to close this relay completing a circuit to the opposite side of the coil 102 and energizes coil 163 of relay R–3 thereby opening this relay and breaking the circuit to the brake 107. The clutch then drives the shaft 99 and thereby the shaft 104 at the higher speed to rapidly move the bent sheet out of the bending zone B and into the cooling zone C.

When the sheet has cleared the bending area and as it moves between the blast heads in the cooling area, the timer T–3 times out de-energizing coil 162, permitting the contacts of relay R–7 to open breaking the circuit to the high speed coil 102, and energizes coil 164 of the relay R–4 closing the relay and completing the circuit through the low speed coil 103 of the clutch 100. The armature 101 thus engages the coil 103 whereby the clutch drives the shaft 104 at the lower speed. When this occurs, timer T–4 also times out reversing the valve V whereby the latter introduces pressure fluid into the head end of cylinder 135 moving the piston 134 and the stops carried thereby downwardly and into the path of movement of the sheets. The circuit is thus returned to its initial condition and the apparatus is ready to receive a successive sheet moving out of the furnace and into the bending area. Upon moving into the bending area, of course, the beam of light L is broken and the sequence above described is repeated.

Figure 7:
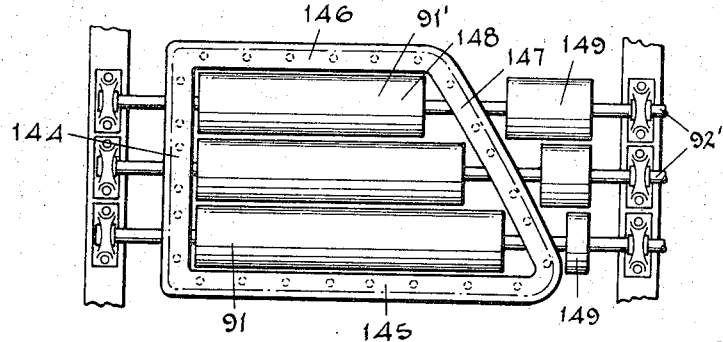
FIG. 7 is a plan view of a modified form of lower pressing mold.

While the operation of the apparatus is in no wise altered by reason of a change in the curvature of the shaping surface 26 of the upper and lower mold parts 24 and 25, it is believed undertandable that some change in the actual means for supporting glass sheets may be necessitated by a change in the outline of the sheets to be bent with a resulting change in the outline of the open ring-like lower mold part. Thus, as shown in FIG. 7, a glass sheet having a pattern-cut outline as indicated in broken line, can be press bent with equally good results on a lower mold having a shaping surface defined by an open ring member identified in its entirety by the numeral 143. The outline of this particular ring could thus include a straight side element 144, a straight end element 145 extending at substantially a right angle thereto and a third element 146 extending at a right angle from the opposite end of the side element and including an angularly directed or curved section 147 disposed opposite the straight side element 144 and forming the free ends of elements 145 and 146. Here again, the ring member 143 is supported by spaced posts 51 on a base member 50. In this event, the support rolls, normally situated within the open area of the ring member as previously described, are replaced by a set of rolls 91' carried on shafts 92' projecting outwardly between the posts 51 and modified by the provision of suitably spaced sheet supporting segments 148 and 149. The element 147 is disposed between the segments 148 of the support rolls 91'. It will be appreciated that segments 148 could be selected to accommodate a mold part of various outline configuration without interfering in any way with the operation of the conveyor 27 or the mold parts 24 and 25.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. A method of bending and tempering glass sheets as the latter are supported in a substantially horizontal plane directly on a conveyor and moved thereby along a predetermined path through a heating area, a bending area and a chilling area disposed along said path, said method comprising heating a sheet to a temperature above the annealing range of the glass while being moved by said conveyor at a preselected speed through a heated atmosphere in said heating area, advancing the heated sheet out of said heated atmosphere and into said bending area at said preselected speed, interrupting the forward movement of the sheet at a predetermined location in said bending area and simultaneously lifting said sheet off the said conveyor on a shaping surface and carrying it into pressing engagement with a complemental shaping surface disposed above said sheet thereby to bend the sheet to the desired curvature and then lowering the sheet onto said conveyor, moving the sheet out of said bending area and into said chilling area at a second speed comparatively faster than said first speed to minimize the loss of heat from the sheet to the ambient atmosphere whereby the sheet will be at a temperature within the annealing range of the glass upon entering said chilling area, reducing the speed of movement of the sheet as it enters said chilling area to a rate of speed slower than said second speed, moving the bent sheet through said chilling area at said last-named speed, and chilling the sheet as it moves through said chilling area.

2. In apparatus for bending glass sheets, the combination of, a frame, a conveyor carried by said frame for supporting and carrying a glass sheet along a predetermined substantially horizontal path, a bending mold having upper and lower mold parts with opposed complemental shaping surfaces formed thereon and conforming in curvature to the glass sheet when bent, means mounting said upper mold part on said frame above said path, means supporting said lower mold part for vertical movement toward and away from said upper mold part between a first position where said lower mold part is disposed below said path and in spaced relation to said upper mold part and a second position where said lower mold part is disposed above said path and in close proximity to said upper mold part, means for sensing the movement of a sheet along said path and for producing a signal as said sheet moves between said mold parts and an actuating mechanism responsive to said signal from said sensing means to move said lower mold part between said first and second positions to lift the glass sheet from said conveyor and into pressing engagement with said upper mold part and thereafter to return the bent sheet to said conveyor.

3. In apparatus for bending glass sheets as defined in claim 2, a locating means mounted above said path in a fixed position longitudinally of the path engageable by the leading edge of said sheet to position said sheet between said upper and lower mold parts.

4. In apparatus for bending glass sheets as defined in claim 3, means actuated by the movement of said mold parts and operable to render said locating means ineffective.

5. In apparatus for bending glass sheets moving successively along a predetermined substantially horizontal path, means for supporting and conveying the sheets along said path, an upper mold part mounted above said path, a ring-type lower mold part disposed beneath said upper mold part, means supporting said lower mold part for vertical movement relative to said path toward and away from said upper mold part, supporting and conveying means located within the periphery of the lower mold part and projecting thereabove for receiving the glass sheet from said first-named supporting and conveying means, actuating means for moving the lower mold part to raise said mold part to lift the sheet off of said second-named supporting and conveying means into pressing engagement with said upper mold part and thereafter lower said lower mold part to return the bent sheet to said second supporting and conveying means.

6. In apparatus for bending glass sheets as claimed in claim 5, in which the first and second sheet supporting and conveying means consist of spaced conveyor rolls rotatable about parallel horizontal axes extending transversely across said path.

7. In apparatus for bending glass sheets as claimed in claim 5, in which said actuating means is operated in response to the movement of a glass sheet between the mold parts.

8. In apparatus for bending glass sheets moving successively along a predetermined substantially horizontal path, a plurality of conveyor rolls rotatable about parallel horizontal axes extending transversely across said path, an upper mold part mounted above said path, a ring-type lower mold part disposed beneath said upper mold part, means supporting said lower mold part for vertical movement relative to said path toward and away from said upper mold part, said lower mold part encircling certain of said conveyor rolls when the mold part is in its lowermost position whereby said certain rolls project above the mold part to support a glass sheet, an actuating mechanism for moving said lower mold part in response to the movement of a glass sheet between the mold parts whereby the lower mold part lifts the sheet off of said rolls and carries it into pressing engagement with said upper mold part and thereafter returns the bent sheet to said rolls.

9. In apparatus for bending glass sheets as defined in claim 11, wherein said means for supporting said lower mold part includes a carriage disposed below said conveyor rolls and mounted for vertical movement relative to said rolls.

10. In apparatus for bending glass sheets, the combination of, a frame, a conveyor carried by said frame for supporting and carrying a glass sheet along a predetermined substantially horizontal path, a bending mold having upper and lower mold parts with opposed complemental shaping surfaces formed thereon and conforming in curvature to the glass sheet when bent, means mounting said upper mold part on said frame above said path, means supporting said lower mold part for vertical movement toward and away from said upper mold part between a first position wherein said lower mold part is disposed below said path and in spaced relation to said upper mold part and a second position wherein said lower mold part is disposed above said path and in close proximity to said upper mold part, locating means disposed adjacent said path to position a sheet moving therealong relative to said complemental shaping surfaces formed on said mold parts, said locating means including an arm having an abutment surface formed thereon to engage the leading edge of a sheet moving along said path, means supporting said arm on said frame for endwise movement relative to said path, and reversible actuating means coupled to said arm and responsive to the movement of said lower mold part for shifting said arm back and forth relative to said frame to move said abutment surface into and out of said path, means disposed adjacent said path for sensing the movement of a sheet along said path and between said mold parts, and an actuating mechanism responsive to said sensing means to move said lower mold part between said first and second positions to lift the glass sheet from said conveyor and into pressing engagement with said upper mold part and thereafter to return the bent sheet to said conveyor.

11. In apparatus for bending each of a plurality of glass sheets moving successively along a predetermined substantially horizontal path between upper and lower mold parts having complemental shaping surfaces formed thereon, the lower mold part being movable vertically toward and away from the upper mold part, a conveyor system having an entry section, a support section and a take-out section disposed end-to-end along said path, said entry section being positioned in advance of said mold parts, means for driving said entry section at a preselected speed, said support section being disposed between said upper and lower mold parts and said take-out section being disposed at the exit end of said support section, multiple speed drive means, means coupling said support section and said take-out section to said multiple speed drive means to selectively drive said support section and said take-out section at said preselected speed and also at a speed greater than said preselected speed, means for sensing the movement of a glass sheet along said path and onto said support section and for producing a signal as said sheets approaches said bending mold, and means responsive to said signal to interrupt the operation of said multiple speed drive means to discontinue the movement of the glass sheet when the sheet reaches a position between said upper and lower mold parts.

References Cited
UNITED STATES PATENTS

| | | | |
|---|---|---|---|
| 2,570,309 | 10/1951 | Black | 65—107 |
| 2,646,647 | 7/1953 | Bamford et al. | 65—103 |

S. LEON BASHORE, *Primary Examiner.*

DONALL H. SYLVESTER, *Examiner.*

A. D. KELLOGG, *Assistant Examiner.*

UNITED STATES PATENT OFFICE
CERTIFICATE OF CORRECTION

Patent No. 3,338,695                          August 29, 1967

George F. Ritter, Jr.

It is hereby certified that error appears in the above numbered patent requiring correction and that the said Letters Patent should read as corrected below.

Column 14, line 41, for the claim reference numeral "11" read -- 8 --.

Signed and sealed this 23rd day of July 1968.

(SEAL)
Attest:

Edward M. Fletcher, Jr.                        EDWARD J. BRENNER

Attesting Officer                             Commissioner of Patents